United States Patent
Bargain

[15] 3,671,490
[45] June 20, 1972

[54] CROSS-LINKED POLYIMIDES

[72] Inventor: Michel Bargain, Lyon, France
[73] Assignee: Rhone-Poulenc S.A., Paris, France
[22] Filed: Jan. 22, 1971
[21] Appl. No.: 108,973

Related U.S. Application Data

[63] Continuation-in-part of Ser. No. 743,010, July 8, 1968, Pat. No. 3,575,924.

[30] Foreign Application Priority Data

July 12, 1967 France..................................67114135

[52] U.S. Cl..........................260/47 CP, 117/124 E, 161/197, 260/30.2, 260/32.6 N, 260/78 U, 264/331
[51] Int. Cl.........................................................C08g 20/32
[58] Field of Search..........................260/47 CP, 78 FF, 78 U

[56] References Cited

UNITED STATES PATENTS 3,575,924  4/1971  Bargain....................................260/47

OTHER PUBLICATIONS

Chemical Abstracts Vol. 71, 1969 pp. 101549 g and 101550 a.

*Primary Examiner*—William H. Short
*Assistant Examiner*—L. L. Lee
*Attorney*—Stevens, Davis, Miller & Mosher

[57] ABSTRACT

The invention provides novel cross-linked polyimides made by reacting a dianhydride with a molar excess of diamine, reacting the product with an unsaturated anhydride to produce an unsaturated polyamide, and heating the latter to produce the cross-linked polyimide.

4 Claims, No Drawings

CROSS-LINKED POLYIMIDES

This application is a continuation-in-part of my application, Ser. No. 743,010 filed July 8, 1968, now U.S. Pat. No. 3,575,924.

The present invention relates to cross-linked polyimides and their production.

The present invention provides new cross-linked polyimides consisting of units of the formula

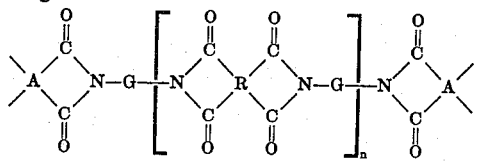

I where $n$ is an integer of at least 1,

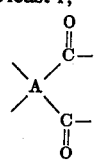

represents the residue of a dicarboxylic acid containing a polymerizable double bond after removal of the two hydroxyl groups in the two carboxylic acid groups and polymerization via the double bond, R represents a tetravalent aliphatic, cycloaliphatic, aromatic or heterocyclic radical containing at least two carbon atoms, and B represents a divalent aliphatic, cycloaliphatic, aromatic, or heterocyclic radical containing at least two carbon atoms.

These polymers are obtained by cyclizing dehydration and polymerization of acid polyamides of the formula

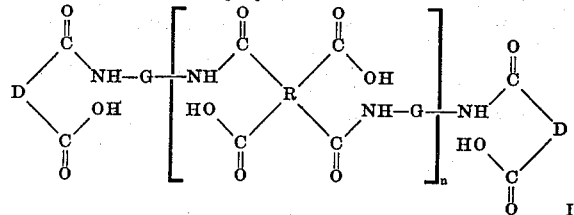

II in which $n$, B and R are as hereinbefore defined, and

is the residue of a dicarboxylic acid containing a polymerizable double bond after removal of the two hydroxyl groups in the two carboxylic acid groups.

More particularly, R may be a straight or branched saturated aliphatic radical having from two to four carbon atoms, a saturated alicyclic radical having five or six carbon atoms in the ring, a heterocyclic radical containing at least one of the atoms O, N and S, a condensed monocyclic or polycyclic aromatic radical or a polycyclic aromatic radical having a number of condensed or uncondensed cyclic systems, attached together by valence bonds or by atoms or groupings; the atoms or groupings by which these aromatic cyclic systems may be attached may be, for example, oxygen or sulphur atoms, alkylene radicals of from one to three carbon atoms, the groupings $-C-$, $-SO_2-$, $-N=N-$, $-N=N-$, $-CO-NY-X-$, $-NY-CO-$, $-CO-O-X-O-CO-$
 ‖                       ↓
 O                       O in which X represents a straight or branched alkylene radical having less than 13 carbon atoms, or a cycloalkylene radical having five or six carbon atoms in the ring or a mono- or polycyclic arylene radical, and Y represents an alkyl radical having from one to four carbon atoms or a condensed monocyclic or polycyclic aromatic or cycloalkyl radical.

G may be a straight or branched alkylene radical having less than 13 carbon atoms, a cycloalkylene radical having five or six carbon atoms in the cycle, a heterocyclic radical containing at least one of the atoms, O, N and S, or a polycyclic aromatic or benzene radical, it being possible for these various radicals to have in addition substituents which do not give parasitic reactions under the operating conditions. The symbol B also includes groups formed by linkage of benzene or alicyclic radicals by valence bonds or divalent groups or atoms, such as for example, oxygen or sulphur atoms, alkylene groups of from one to three carbon atoms, or atoms, or $-NR_4-$, $-P(O)R_3-$, $-N=N-$, $-N=N-$, $-CONH-$, $-CO-O-$,
                                            ↓
                                            O $-SO_2-$, $-SiR_3R_4-$, $-NY-CO-X-CO-NY-$, $-O-CO-X-CO-O-$

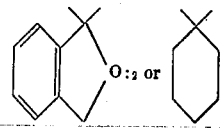

in which $R_3$, $R_4$ and Y each represent an alkyl radical having from one to four carbon atoms or a cycloalkyl radical having five or six carbon atoms in the cycle, or a polycyclic aromatic or benzene radical, and X represents a straight or branched alkylene radical having less than 13 carbon atoms, a cycloalkylene radical having five or six carbon atoms in the cycle, or a mono- or polycyclic arylene radical.

The acid polyamides of formula II, which are new and constitute another subject of the invention, may be prepared by reacting, generally at between 20° and 120° C., in an anhydrous polar solvent such as dimethylformamide, dimethylacetamide, dimethylsulphoxide, N-methyl pyrrolidone or pyridine, a dianhydride of the formula.

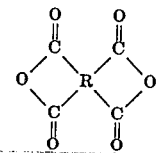

III with a molar excess of a diprimary diamine of the formula $$H_2N - G - NH_2$$ IV so as to obtain an acid polyamide solution having terminal $-NH_2$ groupings

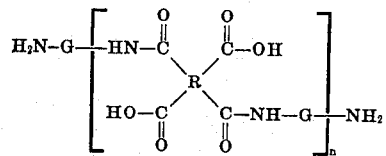

V and then reacting generally at between 0° and 100° C., the solution thus obtained with an unsaturated anhydride of the formula

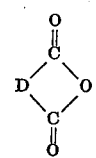

VI where $n$, D, R and B are as hereinbefore defined.

Suitable dianhydrides of formula III which may be employed include the dianhydrides of the following acids: pyromellitic acid, 2,3,6,7-naphthalenetetracarboxylic acid, 3,4,9,10-perylenetetracarboxylic acid, 3,3',4,4'-diphenyltetracarboxylic acid, 3,3',4,4'-diphenylmethanetetracarboxylic acid, ethylenetetracarboxylic acid, cyclopentadienyltetracarboxylic acid, 2,2-diphenyl-3,3',4,4'-propanetetracarboxylic acid, 3,3',4,4'-dipenylsulphonetetracarboxylic acid, cyclopentanetetracarboxylic acid, 3,4,3',4'-benzophenonetetracarboxylic acid, 3,3',4,4'-azoxybenzenetetracarboxylic acid, 3,3',4,4'-azobenzenetetracarboxylic acid, 3,3',4,4'-diphenyloxidetetracarboxylic acid, meta-bis(3,4-dicarboxybenzoyl)benzene, and para-bis(3,4-dicarboxl benzoyl)benzene.

Examples of diamines of formula IV which may be employed include 4,4'-diaminodicyclohexylmethane, 1,4-diaminocyclohexane, 2,6-diaminopyridine, metaphenylenediamine,paraphenylenediamine, 4,4'-diaminodiphenylmethane, 4,4'-diamino-2,2-diphenylpropane, benzidine, 4,4'-diaminodiphenyl oxide, 4,4'-diaminodiphenyl sulphide, 4,4'-diaminodiphenylsulphone, bis-(4-aminophenyl)diphenylsilane, bis-(4-aminophenyl)methylphosphine oxide, bis-(3-aminophenyl)methylphosphine oxide, bis-(4-aminophenyl)phenylphosphine oxide, bis-(4-aminophenyl)phenylamine, 1,5-diaminonaphthalene,metaxylylenediamine,paraxylylenediamine and 1,1-bis-(paraaminophenyl)phthalane.

Suitable monoanhydrides of formula VI are maleic anhydride citraconic anhydride, tetrahydrophthalic anhydride, itaconic anhydride, and the products of a Diels-Adler reaction between a cyclodiene and one of these anhydrides.

The quantities of dianhydride and diamine are so chosen that the ratio $$\frac{\text{Number of moles of diamine of Formula IV}}{\text{Number of moles of dianhydride of Formula III}}$$

is at most equal to 2:1, and it is generally preferable for it to be above 1.05:1.

The quantity of monoanhydride of formula VI must be sufficient to introduce a number of anhydride groupings equal to the number of $-NH_2$ groupings of the intermediate acid polyamide of formula V.

The acid polyamides of formula II have very good solubility in polar organic solvents such as those mentioned in the foregoing. Solutions may be prepared which contain up to 50 percent by weight of solids. The acid polyamides of formula II may be precipitated from their solutions by addition of a diluent such as water, a hydrocarbon or a ketone.

The conversion of the acid polyamides of formula II into he polyimides of formula I may be effected in two stages. In a first phase, the acid polyamide may be subjected to a cyclizing dehydration which consists in treating it with a dehydrating agent known for the production of polyimides, e.g. a tertiary amine, an anhydride of a lower carboxylic acid or a carbodiimide. In a second phase, the linear polyimide thus produced may be polymerized by heating between 80° and 350° C., optionally in the presence of a free radical catalyst (e.g. a peroxide, or azobisisobutyronitrile). However, these two reactions are generally carried out simultaneously by heating the acid polyamide of formula II between 100° and 450° C., optionally in the presence of one of the above-mentioned free radical catalysts.

The new cross-linked polyimides of the invention are infusible and insoluble in the usual solvents. They may be obtained both in the form of films and in the form of moulded articles from an acid polyamide of formula II of low molecular weight.

The following examples illustrate the invention. In these examples, the tests are carried out in accordance with the following standards:

Flexural test: ASTM Standard D790–63, the span being specified in each example.
Tensile Strength test: ASTM Standard D 882–61 T
Dielectric Strength test: ASTM Standard D 150–69 T.

EXAMPLE 1 a. 620 g. of N-methylpyrrolidone and 118.8 g. of bis-(4-aminophenyl)methane are introduced with stirring into a round-bottomed 1 liter flask protected from moisture and in which a nitrogen atmosphere is maintained. The solution is heated to 60° C. and 131 g. of 3,3',4,4'-azobenzenetetracarboxylic anhydride are then gradually introduced in 1 hour 40 minutes. The final solution is maintained at 60° C. for 4 hours after the end of the addition of the anhydride. After cooling, the acid number is 173.5.

To 800 g. of this solution, a solution of 38.58 g. of maleic anhydride in 50 g. of N-methylpyrrolidone is added in 30 minutes, the reaction mixture being maintained at 20° C. The final solution is stirred at 20° C. for 1 hour. Its acid number is then 228, and the Brookfield viscosity of the solution at 25° C. is 9.5 poises. It contains 30.2 percent by weight of solids.

b. Three specimens of glass fiber fabric (30 cm. × 45 cm.) weighing 308 g./m.² are coated with part of this solution (46.5 g.). This fabric has undergone a thermal debatching and a surface treatment with γ-aminopropyltriethoxysilane. The specimens are dried at 120° C. for 40 minutes under reduced pressure (400 mm. Hg) and, after cooling, 16 squares of coated fabric (15 cm. × 15 cm.) are cut out. These squares are stacked to form a laminated assembly which is introduced between the plates of a press preheated at 300° C., and a pressure of 30 kg./cm.² is applied for 1 hour. A rigid laminated plate 3 mm. thick is obtained. After mould release and cooling, test pieces (width 11 mm. thickness 3 mm.) are cut out, which have a flexural strength of 68 kg./mm.² (span = 50 mm.). The laminate contains 16.1 percent of resin. After a thermal test for 235 hours at 250° C. this flexural strength is still 40 kg./mm².

c. With a solution identical to that of paragraph (a) a copper wire having a diameter of 0.8 mm. is enamelled in eight layers, with a vertical enamelling machine provided with eight calibrated nozzles of from 0.84 to 0.94 mm. The furnace is 3 m. in height and the temperature therein varies regularly, the maximum being 440° C. in the upper two-thirds. The wire circulates from the bottom upwards at a speed of 3 m./min. The layer of enamel finally obtained has a thickness in the neighborhood of 0.02 mm. The coating has very good dielectric strength, of the order of 2,000 V., and its thermoplasticity temperature is above 450° C.

EXAMPLE 2 a. An acid polyamide solution is prepared as in Example 1(a), the N-methylpyrrolidone being replaced by an equal weight of dimethylformamide.

b. 589 g. of this solution are gradually introduced into 4 liters of water with vigorous stirring. The precipitate is filtered off, washed with water and dried at 70° C. for several hours under a pressure of 3 mm. Hg. The powder is then finely ground (to a particle diameter less than 200μ) and heated under reduced pressure (4 mm. Hg) at 175° C. for 3 hours and and then at 300° C. for 1 hour. The powder obtained is ground and, after screening, the particles having a diameter smaller than 80 μ are retained.

In a rectangular mould (12.7 cm. × 1.2 cm.), 10 g. of powder are compressed under 300 kg./cm.² for 1 hour at 300° C. After cooling the moulded article has a thickness of 0.53 cm., a flexural strength of 8.3 kg./mm.², and a modulus of elasticity in flexure of 310 kg./mm.² (span=100 mm.). After test heating for 400 hours at 300° C., this article still retains 63 percent of its initial flexural strength.

EXAMPLE 3 a. An acid polyamide solution is prepared as in Example 1(a) from 1,280 g. of dimethylformamide, 158.4 g. of bis-(4-aminophenyl)methane, and 136 g. of 3,3',4,4'-azoxybenzenetetracarboxylic anhydride. 76.9 g. of maleic anhydride in solution in 125 g. of dimethylformamide are then added to 1,395 g. of this solution. The final solution contains 22 percent by weight of solids.

b. The acid polyamide is precipitated from 1,542 g. of solution by pouring into 6 l. of water, and the precipitate is treated as in Example 2(b), except that it is finally heated at 200° C. for 3 hours.

10 g. of the polymer powder are intimately mixed with 0.05 g. of benzoyl peroxide and the whole is heated to 250° C. in a mould identical to that of Example 2(b). The mixture is then heated for 1 hour under a pressure of 250 kg./cm.$^2$ between the plates of a press maintained at 300° C. After mould release and cooling, the moulded article has a thickness of 0.54 cm., a flexural strength of 7.9 kg./mm.$^2$, and a modulus of elasticity in flexure of 343 kg./mm.$^2$ (span =100 mm.) After heating for 237 hours at 300° C., the flexural strength has retained 82 percent of its initial value.

EXAMPLE 4 a. The procedure of Example 1(a) is followed, starting with 143 g. of N-methylpyrrolidone, 19.3 g. of bis-(4-aminophenyl)methane, and 28.3 g. of 3,3',4,4'-azobenzenetetracarboxylic anhydride. A solution of 2.09 g. of maleic anhydride in 9 g. of N-methylpyrrolidone is then added to 178.1 g. of the solution obtained. The concentration by weight of solids in the final solution is 25.2 percent.

b. Part of the solution is deposited on a glass plate. The coating layer has a thickness of 0.02 cm. The coated plate is maintained at 120° C. for 30 minutes and then at 200° C. for 30 minutes. The film is detached from its support and heated at 300° C. for 1 hour. After cooling, test pieces 6.5 mm. wide are cut out, the tensile strength of which is 1,145 kg./cm.$^2$ for a stretching speed of 50 mm./min. The elongation at break is 8 percent.

After two thermal tests, the values of the tensile strength are as follows:

| | |
|---|---|
| after 72 hours at 300° C. | 995 kg./cm.$^2$ |
| after 192 hours at 300° C. | 890 kg./cm.$^2$ | c. 634 g. of the solution prepared in accordance with (a) are gradually introduced into 3 liters of water with vigorous stirring. After filtration, the precipitate is heated at 120° C. for several hours under 3 mm. Hg and then at 200° C. for 2 hours under the same pressure. The powder obtained is finely ground (to a particle diameter less than 80 $\mu$).

10 g. of powder are introduced into a rectangular mould (12.7 cm. × 1.2 cm.) and the whole is placed between the plates of a press preheated at 300° C. When the temperature of the mould reaches 250° C. a pressure of 300 kg./cm.$^2$ is applied and maintained for 1 hour. After mould release and cooling, the moulded article has a thickness of 0.48 cm., a flexural strength of 12.9 kg./mm.$^2$, and a modulus of elasticity of 335 kg./mm.$^2$ (span = 100 mm.).

EXAMPLE 5 a. The procedure of Example 1(a) is followed, starting with 118.8 g. of bis-(4-aminophenyl)methane, 745 g. of dimethylformamide, and 98.3 g. of 3,3',4,4'-azobenzenetetracarboxylic anhydride. To 875 g. of the solution obtained, 54.5 g. of maleic anhydride in solution in 100 g. of dimethylformamide are added.

b. The acid polyamide is precipitated by pouring the solution obtained into 6.4 liters of water. The precipitate is dried as in Example 2(b) and then heated at 300° C. for 1 hour under 3 mm. Hg. After cooling, the powder is finely ground (to a particle diameter less than 80 $\mu$). 23 g. of this powder are introduced into a cylindrical mould (diameter 7.6) and the whole is introduced between the plates of a press preheated to 320° C., and subjected to a pressure of 270 kg./cm.$^2$ between these plates. When thermal equilibrium is reached, the whole is maintained under these conditions for 1 hour. After mould release and cooling, a cylindrical object (height 0.46 cm.) is obtained which has the following characteristics:

| | Initial | After 200 hours at 300° C. |
|---|---|---|
| Dielectric constant (at 50 c/s) | 2.7 | 3.0 |
| Tangent $\delta$ (at 50 c/s) | 1.5·10$^{-3}$ | 2·10$^{-3}$ |
| Resistivity (ohm-cm) | 6·10$^{15}$ | 3·10$^{15}$ |

EXAMPLE 6

Example 4(a) is repeated, replacing N-methylpyrrolidone by the same weight of dimethylformamide, and the solution obtained is then treated as in Example 4(b) and (c), the moulding being effected with 25 g. of powder in a cylindrical mould having an internal diameter of 7.5 cm. After mould release and cooling, the moulded article has a thickness of 0.38 cm. and a flexural strength of 16 kg./mm.$^2$ (span = 2.54 cm.).

After a heating at 250° C. for 4,300 hours, the samples have a flexural strength of 8 kg./mm.$^2$.

EXAMPLE 7 a. 220.2 g. of bis-(4-aminophenyl)ether are dissolved in 2,170 g. of dimethylformamide and 322 g. of 3,3',4,4'-azobenzenetetracarboxylic anhydride are added. The temperature of the solution rises to 38° C., and the solution is cooled to 30° C. and maintained at this temperature for 3 hours. A solution of 19.7 g. of maleic anhydride in 70. g. of dimethylformamide is then added thereto. The mixture is maintained at 27° C. for 1 hour and then heated to 50° C., whereafter 327 g. of acetic anhydride and then 25 cc. of pyridine are added. The final mixture is maintained at 60° C. for 1 hour. The precipitated polymer is filtered off and then treated with acetone at boiling point. After filtration, the residual solvent is eliminated by heating the precipitate at 200° C. for 5 hours.

b. From the powder thus obtained, an article is moulded as indicated in Example 6. The material thus prepared has a flexural strength of 17 kg./mm.$^2$ (span = 2.54 cm). After heating at 300° C. for 600 hours and then 1,000 hours, this strength is still 7.5 kg./mm.$^2$ and 5 kg./mm.$^2$ respectively.

EXAMPLE 8 a. The procedure of Example 7(a) is followed, starting with 54.56 g. of bis-(4-aminophenyl)sulphone, 476 g. of dimethylformamide and 64.4 g. of 3,3',4,4'-azobenzenetetracarboxylic anhydride, the reactants being heated at 40° C. for 4 hours and a solution of 3.9 g. of maleic anhydride in 12 g. of dimethylformamide being then introduced. The cyclization to form imide groupings is effected by the addition of 62 g. of acetic anhydride and 2 cc. of pyridine.

b. 10 g. of the powder obtained are moulded as described in Example 2(b). The moulded article has a flexural strength of 11.2 kg./mm.$^2$ and a modulus of elasticity in flexure of 540 kg./mm.$^2$ (span = 100 mm.).

EXAMPLE 9

The procedure of Example 2 is followed, starting with the following ingredients: 74.25 g. of 1,1-bis-(4-amino-3-methylphenyl)-cyclohexane, 370 g. of dimethylformamide, 73.25 g. of 3,3',4,4'-azobenzenetetracarboxylic anhydride, and 5 g. of maleic anhydride in 15 g. of dimethylformamide. The polymer is precipitated by addition of the solution to 2.5 l. of water. The powder obtained is heated at 200° C. under reduced pressure (20 mm. Hg) for 2 hours, and the red powder obtained is moulded under the conditions described in Example 2(b).

EXAMPLE 10

In accordance with Example 7(a), 22 g. of bis-(4-aminophenyl)-ether and 32.2 g. of 3,3',4,4'-benzophenonetetracarboxylic anhydride in 223 g. of dimethylformamide are reacted for 2 hours, the temperature being maintained between 20° and 25° C. 1.97 g. of maleic anhydride in solution in 5 cc. of dimethylformamide are then introduced and the solution is heated to 50° C. 31 g. of acetic anhydride and 1 cc. of pyridine are then added. The mixture is treated as in Example 7(a), and a yellow powder which, when heated, softens at about 320° C. and then rapidly hardens, is finally obtained.

EXAMPLE 11 a. 55.05 g. of bis-(4-aminophenyl)ether are dissolved in 248.5 g. of dimethylformamide, and 10.9 g. of pyromellitic anhydride are added in 30 minutes, the temperature being maintained at 10°–15° C., followed by 64.8 g. of 3,3',4,4'-azobenzenetetracarboxylic anhydride. The mixture is maintained at 25° C. for 4 hours. 4.97 g. of maleic anhydride in 15 g. of dimethylformamide are then added, and the final solution is maintained at 25° C. for 1 hour. The polymer is precipitated by addition of the solution to 2 liters of water and then treated as in Example 2(b).

b. 25 g. of powder obtained are moulded as described in Example 6. The moulded article has, after cooling and mould release, a flexural strength of 15.4 kg./mm² (span = 2.54 cm.). After thermal treatment at 300° C. for 600 hours, this strength is still 8.8 kg./mm².

EXAMPLE 12 a. A solution of acid polyamide is prepared as in Example 1(a) from 49.55 g. of bis-(4-aminophenyl)methane, 280 g. of dimethylformamide, 73.25 g. of 3,3',4,4'-azobenzenetetracarboxylic anhydride, and 6 g. of tetrahydrophthalic anhydride in 30 g. of dimethylformamide. The polymer is precipitated by adding the solution to 2 liters of water, and the cyclization to form imide groupings is carried out by heating at 200° C. for 2 hours under reduced pressure (10 mm. Hg.).

b. 10 g. of powder are compressed as described in Example 2(b). After cooling, the moulded article has a flexural strength of 12 kg./mm.² and a modulus of elasticity in flexure of 410 kg./mm.² (span = 100 mm.). After heating at 300° C. for 310 hours, the strength is 8.4 kg./mm² and the modulus is still 365 kg./mm².

EXAMPLE 13

A suspension of 337 g. of the dianhydride of para-bis(3,4-dicarboxybenzoyl)benzene in 1,200 g. of dimethylformamide is added progressively over 45 minutes and with stirring to a solution of 176.2 g. of 4,4'-diaminodiphenyl ether in 200 g. of dimethylformamide. The temperature of the mixture rises to 41° C. and is then allowed to cool to 29° C., when a solution of 15.67 g. of maleic anhydride in 34 g. of dimethylformamide is added. The final mixture is allowed to stand with stirring for 3 hours. It is then introduced progressively and with vigorous stirring over 1½ hours into 8 liters of water previously heated to 80° C. The stirring is continued for a further 30 minutes after the end of the addition and the mixture is then filtered. The precipitate is washed with water at 80° C. and then dried at 70° C. under a pressure of 3 mm. Hg. Finally, the precipitate is heated for 20 hours at 250° C. under 3 mm. Hg, and then at 300° C. for 30 minutes at atmospheric pressure.

The powder obtained is finely ground (particle diameter less than 80 μ). 25 g. of the powder are introduced into a cylindrical mould (diameter 7.6 cm.) which is then placed between the plates of a press preheated to 300° C. A pressure of 270 bars is applied and the assembly is kept under these conditions for 1 hour. The hot moulded resin is then subjected to a further thermal treatment at 250° C. for 24 hours, followed by 300° C. for the same period of time. After cooling, the moulded resin possesses at 25° C. a flexural strength of 21.2 kg./mm.² (span=25.4 mm.). After heating at 300° C. for 1,000 hours, this strength is still 14.5 kg./mm².

EXAMPLE 14

42.1 g. of the dianhydride of meta-bis(3,4-dicarboxybenzoyl)-benzene are added over 5 minutes with stirring to a solution of 40 g. of 4,4'-diaminodiphenyl ether in 305 g. of dimethylformamide. The temperature of the solution rises to 38° C. It is then cooled to 30° C. and kept at this temperature for 2½ hours. A solution of 19.6 g. of maleic anhydride in 102 g. of dimethylformamide is added, and the mixture is allowed to stand with stirring for 2½ hours. It is then heated to 59° C. and 60 cm.³ of acetic anhydride and 4 cm.³ of pyridine are added. The final mixture is kept at about 60° C. for 1 hour and then diluted with 410 cm.³ of acetone. After 30 minutes, the precipitated polymer is filtered off, and the polymer is then washed continuously for 5 hours with acetone at the boiling point. Finally, the residual solvent is removed by heating the polymer at 200° C. for 5 hours under a pressure of 3 mm.Hg.

10 g. of the powder obtained are pressed in a rectangular mould (12.7 cm. × 1.2 cm.) at 300° C. under 300 bars for 1 hour. After cooling, the moulded object has at 25° C. a flexural strength of 27.2 kg./mm². After heating at 300° C. for 600 hours, this strength is still 14.4 kg./mm².

EXAMPLE 15

31.9 g. of the dianhydride of para-bis(3,4-dicarboxybenzoyl) benzene are added over 2 minutes with stirring to a solution of 12.4 g. of 4,4'-diaminodiphenyl ether and 2.23 g. of meta-phenylene diamine in 166 g. of dimethylformamide. The temperature of the solution rises to 33° C. and is then kept for 4 hours at this temperature. A solution of 1.47 g. of maleic anhydride in 26 g. of dimethylformamide is added and the mixture is allowed to stand for a further 1 hour 40 minutes with stirring. It is then heated to 55° C. and 27 cm.³ of acetic anhydride and 1.7 cm³ of pyridine are added. The final mixture is kept at about 60° C. for 1 hour and then diluted with 190 cm.³ of acetone. After 1 hour, the precipitated polymer is filtered off hot and washed continuously for 5 hours with acetone at the boiling point. The residual solvent is eliminated by heating the precipitated polymer at 50° C. at atmospheric pressure, then at 200° C. for 3 hours under a pressure of 3 mm. Hg, and finally at 200° C. for 4 hours at the same pressure.

10 g. of the powder obtained are moulded under the same conditions as those described in Example 14. After cooling, the moulded object has at 25° C. a flexural strength of 24 kg./mm². After heating at 300° C. for 2,000 hours, this strength is still 12.9 kg./mm².

I claim:

1. A cross-linked polyimide consisting of units of the formula:

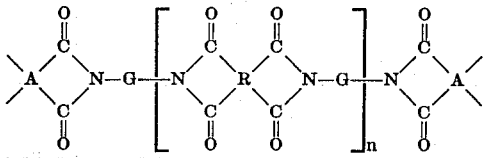

wherein n is an integer of at least one, wherein

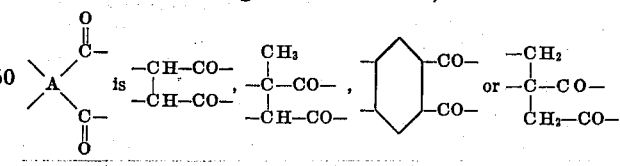

wherein R is

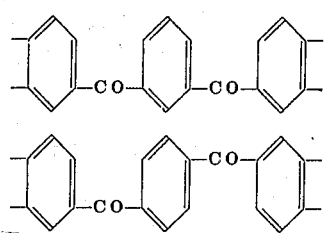

or and wherein G is
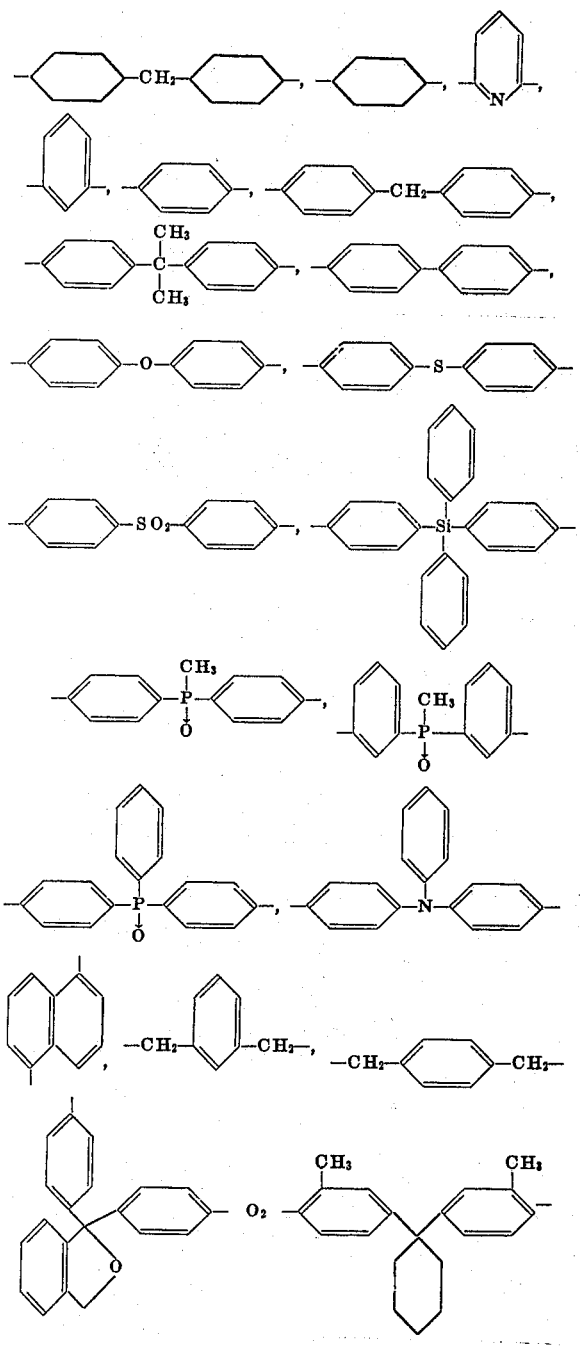
2. A polyamide consisting of the formula:
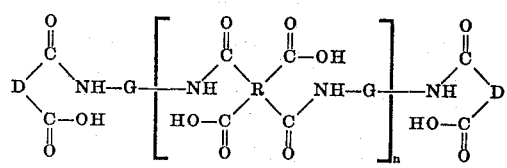
wherein $n$ is an integer of at least one, wherein
$$\begin{array}{c} CO-\\ D\\ CO- \end{array}$$
is
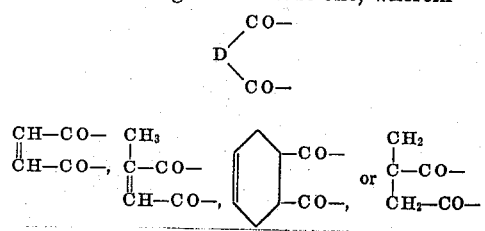
wherein R is
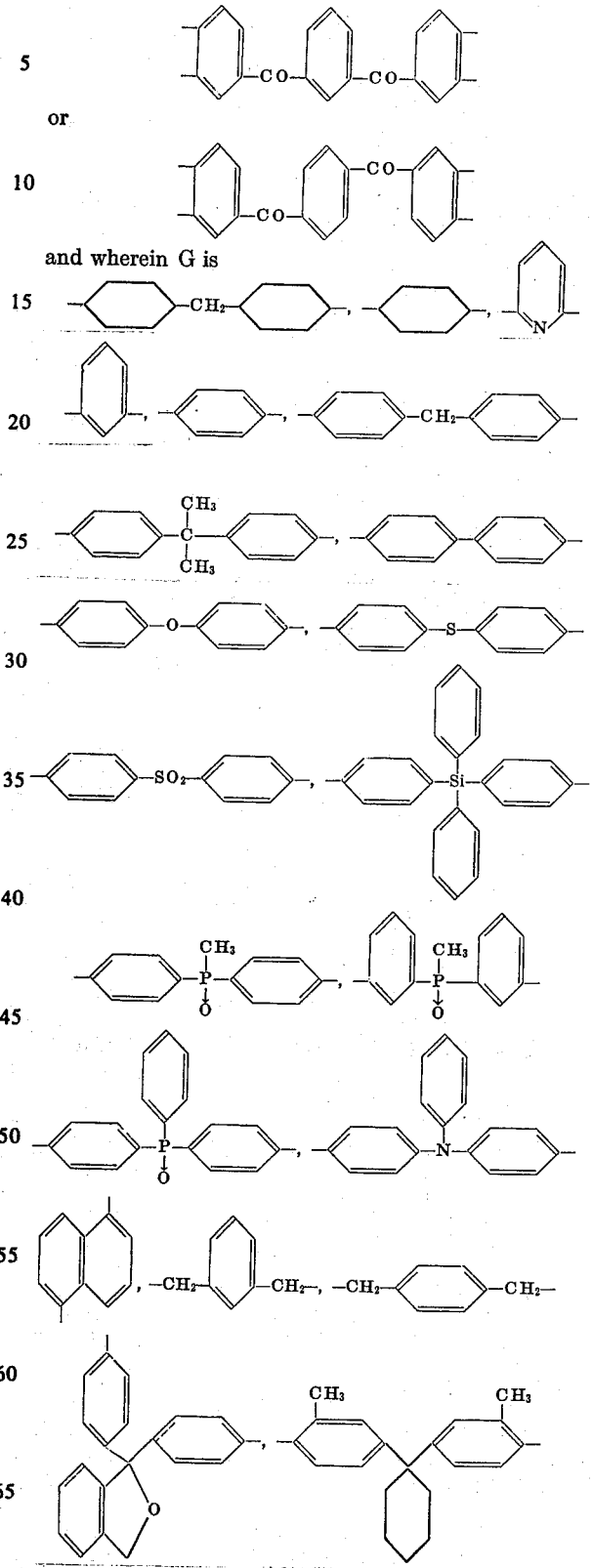
3. A cross-linked polyimide consisting of units of the formula:
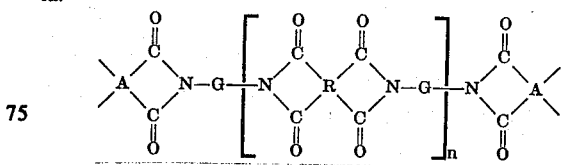

wherein $n$ is an integer of at least 1, wherein
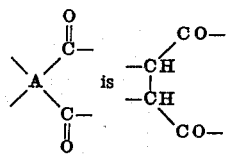 is 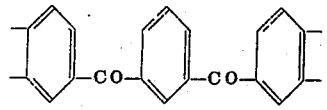
wherein R is
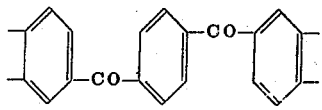
or
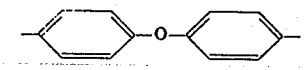
and wherein G is
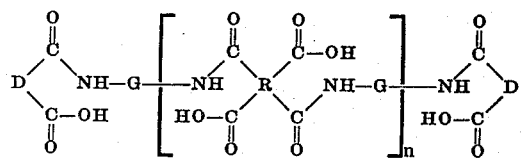
4. A polyamide consisting of the formula:
wherein $n$ is an integer of at least one, wherein
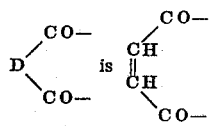 is 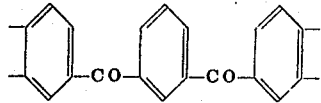
wherein R is
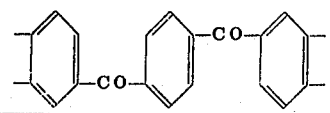
or
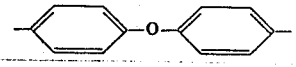
and wherein G is
* * * * *